July 19, 1960
A. MADSEN
2,945,985
DUAL COLOR HEADLAMP FOR VEHICLES
Filed April 23, 1958
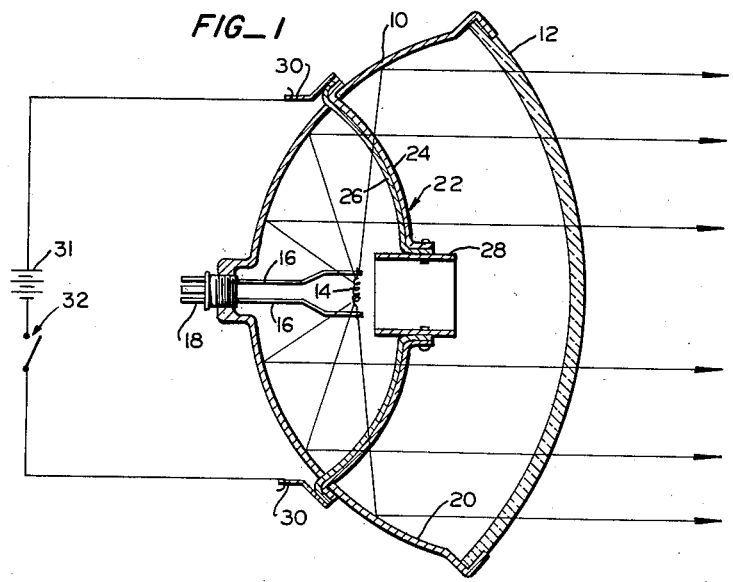
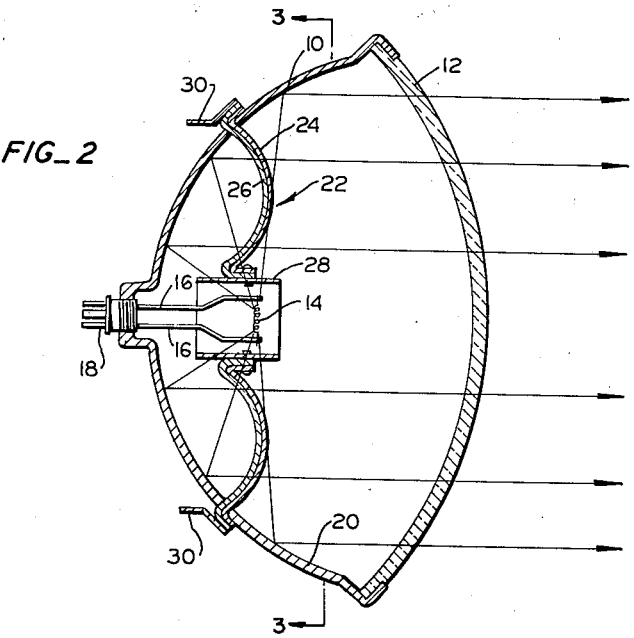
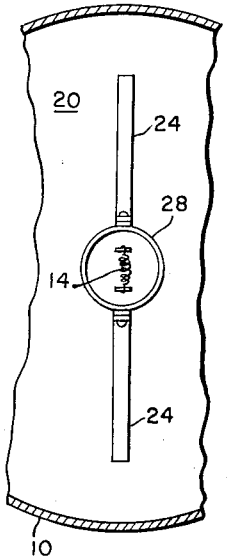
INVENTOR.
ANDREW MADSEN
BY
*Naylor & Neal*
ATTORNEYS

United States Patent Office 2,945,985
Patented July 19, 1960

2,945,985
DUAL COLOR HEADLAMP FOR VEHICLES

Andrew Madsen, 17255 Via Jose, San Lorenzo, Calif.

Filed Apr. 23, 1958, Ser. No. 730,451

2 Claims. (Cl. 315—82)

This invention relates to headlamps for vehicles, and more particularly to a headlamp embodying means enabling a quick transition of the light beam color from, for example, white to amber, thereby adapting the headlamp for efficient use under weather conditions of fog, rain and snow.

An object of the invention is to provide a vehicle headlamp with means disposed internally thereof adapted to selectively convert the natural color of the light emitted from the headlamp to another desired color.

A further object of the invention is to provide a vehicle headlamp with internally disposed and selectively movable light color control means in combination with externally disposed control means for actuating said light color control means.

These and other objects and advantages of the invention will be apparent from the following description taken in conjunction with the drawing forming part of this specification, and in which:

Figure 1 is a view in vertical diametral section of a vehicle headlamp embodying the invention, showing the light color control means in normal position;

Figure 2 is a view similar to that of Figure 1, but showing the light color control means in an operable, or color varying, position; and Figure 3 is a detail view taken along lines 3—3 of Figure 2.

With reference to the drawing, the sealed beam vehicle headlamp therein shown comprises, conventionally, housing 10, lens 12, and filament 14 connected across conductors 16 terminating in contact plug 18. The housing 10 is provided with a parabolic light reflecting surface 20.

A bracket 22 comprised of a metal strip 24 having a relatively high coefficient of thermal expansion and strip 26 having a relatively low coefficient of thermal expansion is suitably mounted in housing 10 and disposed in supporting relation to a sleeve 28 composed of colored translucent material, such as amber colored plastic. Disposed in current conducting relation to the bracket 22 outside of housing 10 are contacts 30 across which a source of current 31, is adapted to be connected by circuitry comprising a single pole, single throw, switch 32. The switch is best located in the driver's compartment of the vehicle on which the headlamps are disposed.

When the bracket 22 is at ambient temperature, the sleeve 28 is disposed forwardly of filament 14. Thus, the light rays emitted from filament 14 and reflected from surface 20 is conventionally white in color. When the vehicle on which the described headlamps are disposed enters an area of fog, rain or snow, the operator closes the circuit control switch, not shown, for bracket 22, thereby causing the bracket to rapidly rise in temperature. The bracket is thus caused to warp from the position of Figure 1 to that of Figure 2 wherein the sleeve 28 is disposed in concentrically enveloping relation to filament 14. The light emitted from the headlamp is thus changed from its normal color to the color of sleeve 28.

When the control switch is opened, the electrically resistant bimetallic bracket 22 returns to the ambient temperature position of Figure 1.

The strips 24 and 26 forming bracket 22 are of insubstantial width, e.g. on the order of one quarter inch or so, so as to obstruct only a minor amount of the light passing from the reflecting surface 20 to lens 12.

From the foregoing description, it will be apparent that the headlamp embodying the invention enables the attainment of the objects above set forth, and while a specific embodiment of the invention has been shown and described it is to be understood that all substantial equivalents thereof are considered to be within the spirit and scope of the invention.

What is claimed is:

1. In a sealed beam headlamp for vehicles comprising a housing, a parabolic reflector surface associated therewith, an electrical white light-emitting filament disposed forwardly of the center of said reflector surface, and a lens closure for said housing; a transparent sleeve normally disposed forwardly of said filament within said housing, a support bracket therefor carried by said housing and comprising a pair of superposed electrically resistive strips having varying coefficients of thermal expansion, and electrical means associated with said bracket for heating the same and imparting a warping movement thereto to bring said sleeve into laterally enveloping relation with said filament, said sleeve being tinted with a selected color corresponding to the color of light which is desired to be emitted from said headlamp.

2. A headlamp comprising a parabolic reflector, a light source positioned centrally with respect to said reflector, a transparent sleeve of colored material, and movable mounting means disposing said sleeve forwardly of said reflector and light source and concentrically of said light source for selective linear movement rearwardly into enveloping relation with respect to said light source, said mounting means comprising a metallic bracket adapted upon being heated to move said sleeve into enveloping relation with said light source and adapted upon being cooled to ambient temperature to move said sleeve out of enveloping relation with said source.

References Cited in the file of this patent

UNITED STATES PATENTS

| | | |
|---|---|---|
| 1,143,611 | Christensen et al. | June 22, 1915 |
| 1,955,173 | Chambers | Apr. 17, 1934 |
| 2,208,079 | Nosal | July 16, 1940 |
| 2,563,552 | Roben | Aug. 7, 1951 |
| 2,592,102 | Alexander | Apr. 8, 1952 |
| 2,822,495 | Albright | Feb. 4, 1958 |